US006718763B2

(12) United States Patent
Maruta et al.

(10) Patent No.: US 6,718,763 B2
(45) Date of Patent: Apr. 13, 2004

(54) HYDRAULIC DRIVE UNIT

(75) Inventors: Kazuhiro Maruta, Kawaguchi (JP); Nobumi Yoshida, Oyama (JP)

(73) Assignee: Komatsu Ltd., Tokyo (JP)

( * ) Notice: Subject to any disclaimer, the term of this patent is extended or adjusted under 35 U.S.C. 154(b) by 29 days.

(21) Appl. No.: 10/231,223

(22) Filed: Aug. 30, 2002

(65) Prior Publication Data

US 2003/0041727 A1 Mar. 6, 2003

(30) Foreign Application Priority Data

Sep. 3, 2001 (JP) ....................................... 2001-265808

(51) Int. Cl.[7] ................................................ F16D 31/02
(52) U.S. Cl. ............................................ 60/468; 60/456
(58) Field of Search .................................... 60/456, 468

(56) References Cited

U.S. PATENT DOCUMENTS 5,950,431 A * 9/1999 Oogushi ...................... 60/468

* cited by examiner

*Primary Examiner*—Edward K. Look
*Assistant Examiner*—Michael Leslie
(74) *Attorney, Agent, or Firm*—Varndell & Varndell, PLLC

(57) ABSTRACT

A balance of force acting on a pool 21 of a control valve 20 is expressed by $(P_1-P_3)\cdot A=F+f$ When it is assumed that a pressure difference $P_1-P_2$ before and after a throttle 42 is $\Delta P_{12}$ to modify the above expression, an expression $\Delta P_{12}\cdot A+(P_2-P_3)\cdot A=f+F$ is obtained. According to the present invention, the force $\Delta P_{12}\cdot A$ corresponding to the pressure difference $\Delta P_{12}$ before and after the second throttle 42 of the first term of the left-hand side is applied to the control valve 20 as a force capable of canceling the flow force f at the first term of the right-hand side.

14 Claims, 14 Drawing Sheets

HYDRAULIC DRIVE UNIT

BACKGROUND OF THE INVENTION

1. Field of the Invention

The present invention relates to a hydraulic drive unit for driving a fan or the like.

2. Description of the Related Art

A radiator for the engine of construction machines and the like is cooled by a hydraulically operated fan. The hydraulically operated fan has a hydraulic pump as a hydraulic source and is rotated as a hydraulic motor is driven to rotate. The hydraulic pump is driven by the engine.

Lately, there are demands for operation of construction machines at a low noise level. Therefore, it is necessary to drive the hydraulically operated fan at a lower speed while securing adequate cooling performance.

To achieve it, it is necessary to control a flow rate flowing into the hydraulic motor so as to obtain the control characteristic $LN_3$ of FIG. 9. The engine speed increases when controlled according to the control characteristic $LN_3$, and the flow rate flowing into the hydraulic motor is kept at a fixed level when the engine speed increases and discharge flow rate Q of the hydraulic pump becomes prescribed flow rate Qc or more. Therefore, characteristic $L_0$ is obtained, indicating that when engine speed N becomes prescribed speed Nc or more, rotational speed NF of the fan is kept at a prescribed level as shown in FIG. 4. Such a control characteristic is called as a flow control characteristic.

The flow control characteristic is obtained by adopting a variable-capacity hydraulic pump as the hydraulic pump and controlling a swash plate.

However, the variable-capacity hydraulic pump is generally expensive. Therefore, it is demanded to use a relatively inexpensive fixed-capacity hydraulic pump such as a gear pump to realize the flow control characteristic.

Therefore, the hydraulic circuit shown in FIG. 10 has been conventionally used.

(Related Art 1)

Specifically, as shown in FIG. 10, fixed-capacity hydraulic pump 2 such as a gear pump is driven by an unshown engine to discharge pressure oil to oil passage 7. The pressure oil discharged from the hydraulic pump 2 is supplied to hydraulic motor 1 through the oil passage 7.

Throttle 41 is disposed on the oil passage 7. The oil passage 7 is branched to oil passage 15 which is connected to an inlet port of control valve 20. An outlet port of the control valve 20 is connected to tank 3 through oil passage 16. The control valve 20 is provided with spring 20*c*. The upstream of the throttle 41 is connected to pilot port 20*d* through pilot oil passage 51. The pilot port 20*d* is one of two pilot ports 20*d*, 20*e* of the control valve 20 and located on the side opposite to the side where spring 20*c* is disposed. The downstream of the throttle 41 is connected to the pilot port 20*e*, which is located on the same side where the spring 20*c* is disposed, through pilot oil passage 52.

The structure of the control valve 20 of FIG. 10 is shown in FIG. 11. As shown in FIG. 11, the control valve 20 is a valve having a spool structure.

When it is assumed that a pressure on the upstream side of the throttle 41 is P2, a pressure on the downstream side thereof is P3, a sectional area of spool 21 is A and a spring force of the spring 20*c* is F, a balance of force acting on the spool 21 of the control valve 20 is ideally expressed by the following expression (1).

$$(P2-P3)\cdot A=F \tag{1}$$

Therefore, when the control valve 20 operates as indicated by the expression (1), force ((P2−P3)·A) which corresponds to pressure difference P2−P3 before and after the throttle 41 and the prescribed spring force (F) of the spring 20*c* are mutually balanced and therefore a flow rate of the pressure oil flowing through the throttle 41 is kept at a prescribed constant level according to the prescribed spring force, and an ideal flow control characteristic indicated by $LN_3$ in FIG. 9 is obtained.

However, the flow rate actually flowing into the hydraulic motor does not become constant, and the characteristic indicated by $LN_1$ is obtained, which indicates that the flow rate flowing into the hydraulic motor tends to increase according to an increase in pump discharge flow rate Q.

The reason is as follows. When the spool 21 of the control valve 20 opens to discharge the pressure oil to the tank 3 in FIG. 11, the pressure oil is discharged along streamline V which has a component parallel with the spool 21. Therefore, a force called a flow force acts on the spool 21 of the control valve 20 in the same direction as that of the spring force F. The flow force increases according to an increase in flow rate of the pressure oil passing through the throttle 41.

When it is assumed that the flow force is f, the balance of force acting on the spool 21 of the control valve 20 is indicated by the following expression (2).

$$(P2-P3)\cdot A=F+f \tag{2}$$

When the control valve 20 operates according to the expression (2), the spool 21 is pushed back by the flow force f in a direction that the opening of the spool 21 is closed. Therefore, as indicated by $LN_1$ in FIG. 9, the flow rate flowing into the hydraulic motor shows a tendency to increase according to the increase in pump discharge flow rate Q.

Thus, the related art 1 has drawbacks as described above.

(Related Art 2)

To remedy the drawbacks of the related art 1, it is tried to improve a notch shape or the like of the spool 21 so to remove the component possessed by the streamline V, which is parallel to the spool 21. A control characteristic of the related art 2 is indicated by $LN_2$ in FIG. 9.

According to the related art 2 (characteristic $LN_2$), the problems of the related art 1 (characteristic $LN_1$) are improved to some extent, but the flow rate flowing into the hydraulic motor still tends to increase according to the increase in pump discharge flow rate Q. Therefore, even when the engine speed becomes the prescribed speed or more, the rotational speed of the fan continues to increase, and its noise cannot be suppressed to a prescribed level. In other words, a desired target to suppress the noise to a predetermined level when the engine speed is at a prescribed level or more cannot be achieved.

The present invention was made in view of the above circumstances and provides a low-cost and low-noise hydraulic drive unit by making it possible to realize an ideal flow control characteristic by means of inexpensive hydraulic equipment.

SUMMARY OF THE INVENTION

A first aspect of the present invention is directed to a hydraulic drive unit comprising:

- a hydraulic source which increases a discharge flow rate according to an increase in rotational speed;
- a throttle through which pressure oil discharged from the hydraulic source passes;
- hydraulic equipment which operates upon inputting the pressure oil having passed through the throttle; and a control valve which controls the pressure oil passing through the throttle so that the flow rate passing through the throttle becomes a prescribed level when the rotational speed becomes a prescribed level or more, wherein:

a force for canceling a flow force produced by the control valve is applied to the control valve.

Specifically, as shown in FIG. 2, it is assumed that a pressure on the upstream side of second throttle 42 is $P_1$, a pressure on the downstream side thereof is $P_2$ (pressure on the upstream side of the first throttle 41), a pressure on the downstream side of the first throttle 41 is $P_3$, the sectional area of the spool 21 is A, the spring force of the spring 20*c* is F, and the flow force is f. Then, a balance of force acting on the spool 21 of the control valve 20 is indicated by the following expression (3).

$$(P1-P3)\cdot A=F+f \qquad (3)$$

Here, when it is assumed that the pressure difference $P_1-P_2$ before and after the second throttle 42 is $\Delta P_{12}$ (see FIG. 2) to modify the expression (3), the following expression (4) is obtained.

$$\Delta P12\cdot A+(P2-P3)\cdot A=f+F \qquad (4)$$

In the expression (4), $\Delta P_{12}\cdot A$ at the first term of the left-hand side indicates a force corresponding to the pressure difference $\Delta P_{12}$ before and after the second throttle 42, which is applied to the control valve 20 in a direction opposite to that of the spring force F of the spring 20*c* and that of the flow force f.

According to the first aspect of the invention, for example, the force $\Delta P_{12}\cdot A$ corresponding to the pressure difference $\Delta P_{12}$ before and after the second throttle 42 is applied to the control valve 20 as a force capable of canceling the flow force f at the first term of the right-hand side of the expression (4).

The first aspect of the invention does not always require the second throttle 42 and can use different means if it is possible to apply a force, which can cancel the flow force f produced by the control valve 20, to the control valve 20.

The application of such a force to the control valve 20 changes the expression (4) to $(P_2-P_3)\cdot A=F$, and there is obtained an ideal flow control characteristic indicated by $LN_3$ in FIG. 9. Under control according to the control characteristic $LN_3$ shown in FIG. 9, the engine speed increases and when the discharge flow rate Q of the hydraulic pump 2 becomes the prescribed flow rate Qc or more, the flow rate flowing into the hydraulic motor 1 is kept at a prescribed level. Therefore, there is obtained the characteristic $L_0$ that the rotational speed NF of the fan 36 is kept at a prescribed level when the engine speed N becomes the prescribed speed Nc or more as shown in FIG. 4.

Therefore, according to the first aspect of the invention, the effect of suppressing noise to a prescribed level when the engine speed is at the prescribed level Nc or more can be achieved by inexpensive hydraulic equipment such as the hydraulic source 2 (fixed-capacity hydraulic pump 2), the control valve 20 (changeover valve 20) and the throttle 42.

A second aspect of the invention is directed to the hydraulic drive unit according to the first aspect of the invention, wherein a throttle for adjusting the flow force, which produces a pressure difference corresponding to the flow force, is disposed, and a force corresponding to the pressure difference before and after the flow force adjustment throttle is applied to the control valve.

The second aspect of the invention applies the force $\Delta P_{12}\cdot A$ corresponding to the pressure difference $\Delta P_{12}$ before and after the second throttle 42 for adjusting the flow force to the control valve 20 to cancel the flow force f of the first term of the right-hand side of the expression (4).

A third aspect of the invention is directed to a hydraulic drive unit comprising:

a hydraulic source which increases a discharge flow rate according to an increase in rotational speed;

a first throttle through which pressure oil discharged from the hydraulic source passes;

hydraulic equipment which operates upon inputting the pressure oil having passed through the first throttle; and a control valve which controls the pressure oil passing through the first throttle so that the flow rate passing through the first throttle becomes a prescribed level when the rotational speed becomes a prescribed level or more, wherein:

a second throttle which produces a pressure difference corresponding to a force for canceling the flow force produced by the control valve is disposed; and a force corresponding to the pressure difference before and after the second throttle is applied to the control valve in a direction to cancel the flow force.

The third aspect of the invention applies the force $\Delta P_{12}\cdot A$ according to the pressure difference $\Delta P_{12}$ before and after the second throttle 42 to the control valve 20 in a direction opposite to that of the flow force f to cancel the flow force f of the first item of the right-hand side of the expression (4).

A fourth aspect of the invention is directed to the hydraulic drive unit according to the third aspect of the invention, wherein:

the control valve is provided with a spring for producing a spring force corresponding to the prescribed flow rate;

the second throttle is disposed on the upstream side of the first throttle;

the pressure on the upstream side of the second throttle is applied to the control valve on the side opposite to the spring; and a pressure on the downstream side of the first throttle is applied to the control valve on the same side as the spring.

The fourth aspect of the invention has the spring 20*c* on the control valve 20 to apply the pressure $P_1$, which is on the upstream side of the second throttle 42, to the control valve 20 in a direction opposite to the side where the spring 20*c* is disposed. And, the pressure $P_3$ on the downstream side of the first throttle 41 is applied to the control valve 20 on the same side as that of the spring 20*c*. Thus, the third expression $((P_1-P_3)\cdot A=F+f)$ holds for the force acting on the control device 20, so that the expression (4) holds accordingly. Thus, the flow force f produced by the control valve 20 is cancelled.

A fifth aspect of the invention is directed to the hydraulic drive unit according to the fourth aspect of the invention, wherein a third throttle is also disposed to adjust the pressure on the upstream side of the second throttle.

According to the fifth aspect of the invention, the third throttle 43 is, for example, disposed to connect the upstream side and the downstream side of the second throttle 42 so as to adjust the pressure $P_1$ on the upstream side of the second throttle 42. Therefore, the pressure $P_1$ on the upstream side of the second throttle 42 can be decreased by appropriately determining the diameter or the like of the third throttle 43. However, the pressure $P_2$ on the downstream side thereof is determined as a lower limit. When the pressure $P_1$ on the upstream side of the second throttle 42 decreases, the force $\Delta P_{12}\cdot A$ corresponding to the pressure difference $\Delta P_{12}$ before and after the second throttle 42 can be compensated so as to agree with the flow force f in the expression (4). Thus, the ideal flow control characteristic indicated by $LN_3$ in FIG. 9 can be obtained.

A sixth aspect of the invention is directed to the hydraulic drive unit according to the fifth aspect of the invention, wherein the third throttle is formed in a spool of the control valve.

According to the sixth aspect of the invention, the third throttle 43 is formed in the spool 21 as shown in FIG. 1. Therefore, the third throttle 43 can be easily added to the existing control valve 20, and the production cost can be reduced.

A seventh or eleventh aspect of the invention is directed to the hydraulic drive unit, wherein the hydraulic equipment is a hydraulic motor for driving a fan.

According to the seventh or eleventh aspect of the invention, there is obtained the characteristic $L_0$ that when the engine speed N becomes the prescribed speed Nc or more as shown in FIG. 4, the rotational speed NF of the fan 36 is kept at a prescribed level.

Therefore, according to the seventh or eleventh aspect of the invention, there is an effect that noise of the fan 36 can be suppressed to a prescribed level when the engine speed is at the prescribed level Nc or more.

An eighth or twelfth aspect of the invention is directed to the hydraulic drive unit, wherein the hydraulic equipment is a hydraulic motor, and the control valve and the throttle are built in the hydraulic motor.

According to the eighth or eleventh aspect of the invention, because the control valve 20 and the throttle 41 (42,43) are built within the body 11 of the hydraulic motor 1 as indicated by a dash and dotted line in FIG. 3, an installation area of the hydraulic drive unit becomes small, and the hydraulic drive unit has a simple structure.

A ninth or thirteenth aspect of the invention is directed to the hydraulic drive unit, wherein the hydraulic source is a fixed-capacity hydraulic pump.

The fixed-capacity hydraulic pump 2 such as a gear pump is generally inexpensive as compared with a variable-capacity hydraulic pump and can be used to achieve an ideal flow control characteristic.

A tenth or fourteenth aspect of the invention is directed to the hydraulic drive unit, wherein prescribed flow rate adjustable means which varies the prescribed flow rate is further disposed.

According to the tenth or fourteenth aspect of the invention, the prescribed flow rate of the pressure oil flowing through the first throttle 41 changes when the prescribed spring force of the spring 20*c* of the control valve 20 changes as shown in FIG. 6. Therefore, when a cooling water temperature of the radiator changes as indicated by $t_1$, $t_2$ and $t_3$ as shown in FIG. 7A, optimum control characteristics $L_1$, $L_2$ and $L_3$ conforming to the cooling water temperatures are obtained.

BRIEF DESCRIPTION OF THE DRAWINGS

FIG. 11 is a diagram showing a structure of a conventional control valve;

DESCRIPTION OF THE PREFERRED EMBODIMENTS

Embodiments of the hydraulic drive unit according to the present invention will be described.

It is assumed in the embodiments that the hydraulic drive unit is a hydraulically operated fan unit.

Figure 3:
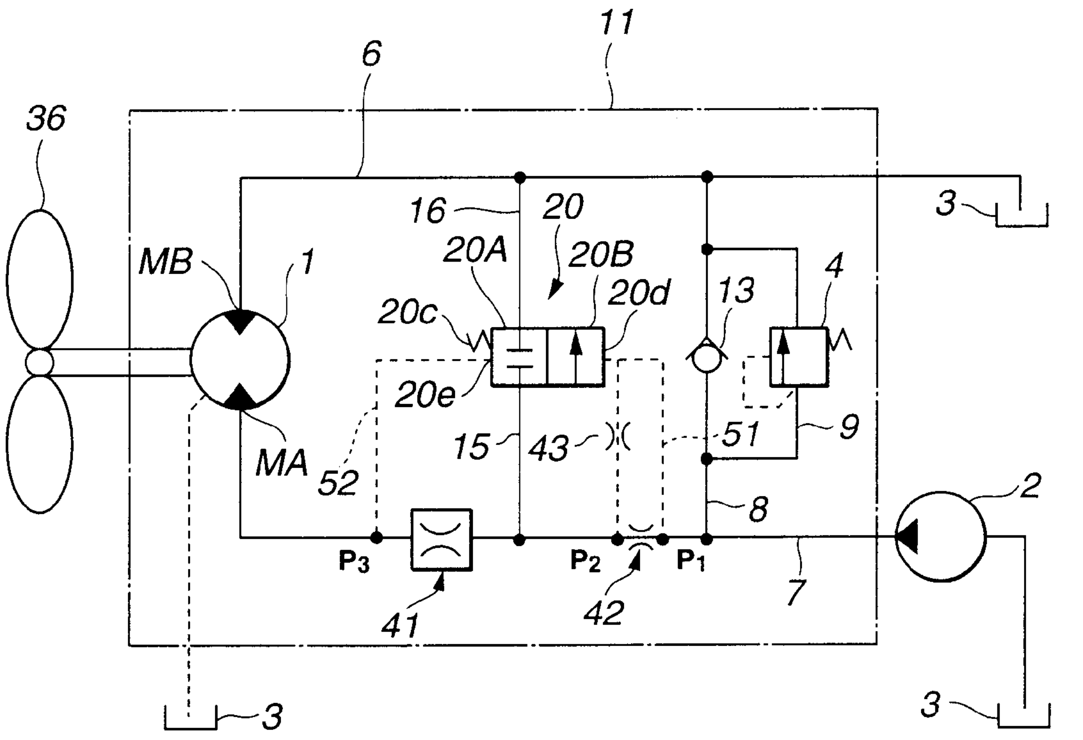
FIG. 3 shows a hydraulic circuit diagram according to a first embodiment.

FIG. 3 is a hydraulic circuit diagram of the first embodiment.

As shown in FIG. 3, the unit of this embodiment mainly comprises the hydraulic pump 2, the body 11 of the hydraulic motor 1, and the cooling fan 36.

The hydraulic pump 2 is a fixed-capacity hydraulic pump such as a gear pump. But, a variable-capacity hydraulic pump can also be used.

The hydraulic pump 2 is driven by an unshown engine and discharges the pressure oil to the pump discharge oil passage 7. The discharge port of the hydraulic pump 2 is connected to pressure oil supply port MA of the hydraulic motor 1 through the pump discharge oil passage 7. Therefore, the pressure oil discharged from the hydraulic pump 2 is supplied to the pressure oil supply port MA of the hydraulic motor 1 through the pump discharge oil passage 7.

The cooling fan 36 is connected to the revolving shaft of the hydraulic motor 1 and rotates when the hydraulic motor 1 operates.

The pressure oil discharge port MB of the hydraulic motor 1 is connected to the tank 3 through the oil passage 6. Therefore, the pressure oil is discharged from the pressure oil discharge port MB to the tank 3 through the oil passage 6 when the hydraulic motor 1 operates.

The first throttle 41 is disposed on the pump discharge oil passage 7. And, the second throttle 42 is disposed on the pump discharge oil passage 7 on the upstream side of the first throttle 41.

The first and second throttles 41, 42 are built in the body 11 of the hydraulic motor 1.

The pump discharge oil passage 7 is branched to the oil passage 15 and connected to the inlet port of the control valve 20. The outlet port of the control valve is connected to the tank 3 through the oil passage 16.

The control valve 20 is a two-position changeover valve and has shut-off position 20A and open position 20B. And, the control valve 20 is built in the body 11 of the hydraulic motor 1.

The spring 20*c* is provided to the control valve 20. The upstream of the second throttle 42 is connected to the pilot port 20*d* through the pilot oil passage 51. The pilot port 20*d* is one of two pilot ports 20*d*, 20*e* of the control valve 20 and disposed on the side opposite to the side where the spring 20*c* is disposed. And, the downstream of the first throttle 41 is connected to the pilot port 20*e*, which is located on the same side where the spring 20*c* is disposed, through the pilot oil passage 52.

The pilot port 20*d* of the control valve 20, namely the upstream side of the second throttle 42, is connected to the downstream side of the second throttle 42 through the third throttle 43. The third throttle 43 is built in the body 11 of the hydraulic motor 1 in the same manner as the first throttle 41 and the second throttle 42.

When it is assumed that the presser on the upstream side of the second throttle 42 is $P_1$ and the pressure on the downstream side of the first throttle 41 is $P_3$, a force proportional to the pressure difference $P_1-P_3$ before and after the two throttles 42, 41 is applied to the control valve 20 in a direction against the spring force F of the spring 20*c*.

Therefore, when a flow rate passing through the throttles 42, 41 is small and the pressure difference $P_1-P_3$ is smaller than the prescribed pressure determined by the spring 20*c*, the control valve 20 is switched to the shut-off position 20A. Therefore, the pressure oil flowing through the pump discharge oil passage 7 is supplied to the pressure oil supply port MA of the hydraulic motor 1 without being discharged to the tank 3 through the control valve 20.

Figure 9:
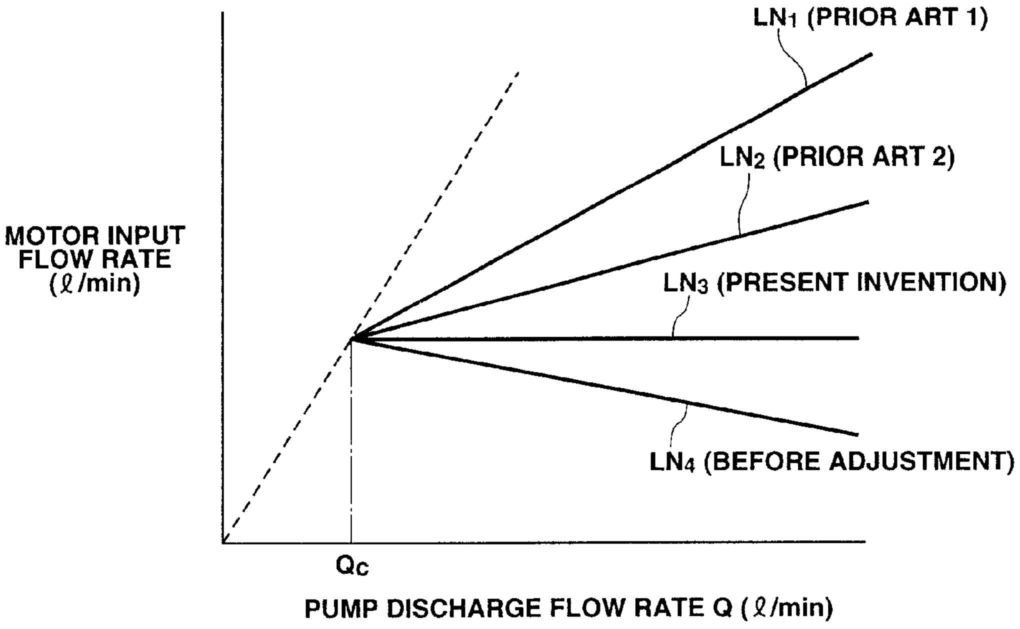
FIG. 9 shows a diagram showing a control characteristic of the embodiment in comparison with those according to related arts.
Figure 10:
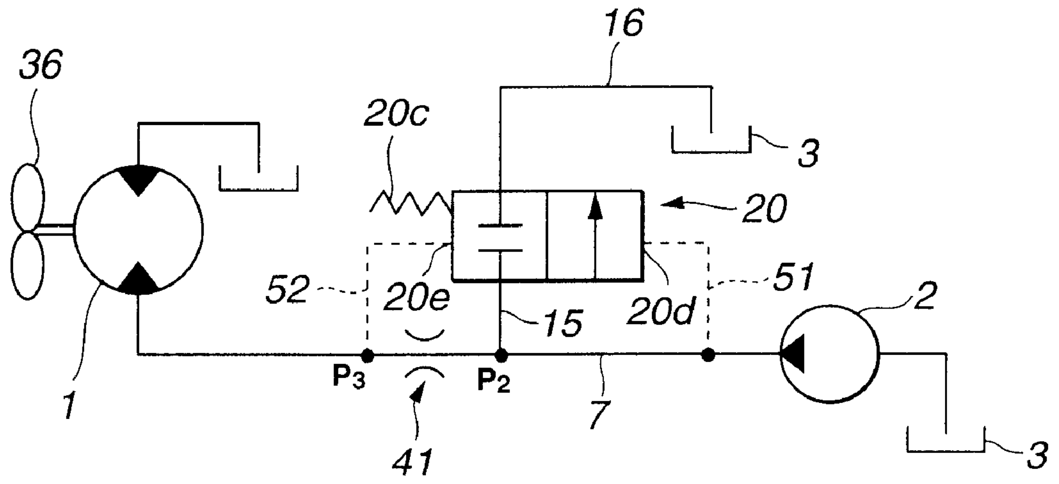
FIG.10 (PRIOR ART)
FIG. 10 is a diagram showing a conventional hydraulic circuit.
Figure 11:
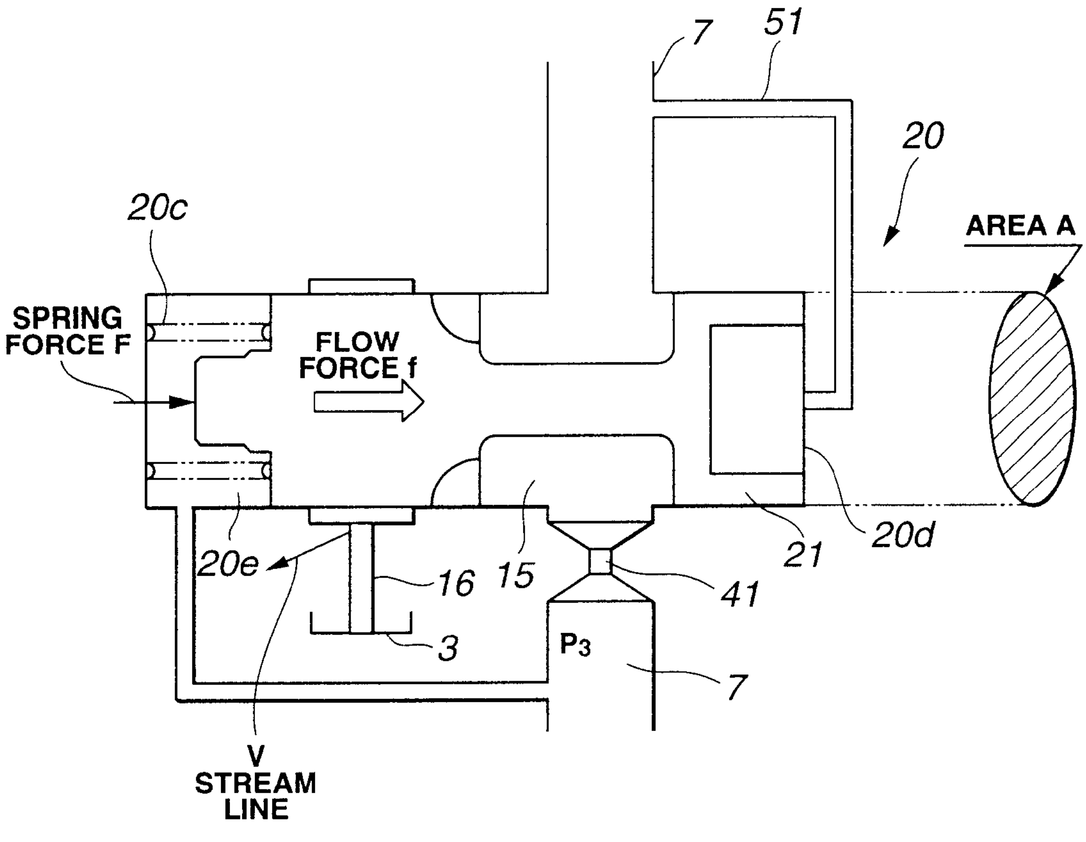
FIG.11 (PRIOR ART)
FIG. 11 is a diagram showing the structure of a conventional control valve.

As a result, when the pump discharge flow rate Q is smaller than the prescribed flow rate Qc as shown in FIG. 9, the flow rate flowing into the hydraulic motor 1 increases according to the increase in pump discharge flow rate Q.

Meanwhile, when the flow rate flowing through the throttles 42, 41 is high and the pressure difference $P_1-P_3$ is the prescribed pressure or more determined by the spring 20*c*, the control valve 20 is switched to the open position 20B. Therefore, the pressure oil flowing through the pump discharge oil passage 7 is discharged to the tank 3 through the control valve 20, and the flow rate supplied to the pressure oil supply port MA of the hydraulic motor 1 decreases. When the flow rate passing through the pump discharge oil passage 7 decreases, the pressure difference $P_1-P_3$ before and after the throttles 42, 41 becomes small, and the control valve 20 is switched to the shut-off position 20A. Thus, the flow rate flowing through the pump discharge oil passage 7 increases. The above procedure is repeated to keep the flow rate flowing into the hydraulic motor 1 at a prescribed value according to the prescribed pressure of the spring 20*c*.

As a result, when the pump discharge flow rate Q is at the prescribed level Qc or more as shown in FIG. 9, the flow rate flowing into the hydraulic motor 1 is kept at the prescribed level regardless of the amount of the pump discharge flow rate Q.

The intake valve 13 and the safety valve 4 are disposed on the upstream side of the second throttle 42. These intake valve 13 and safety valve 4 are also built in the body 11 of the hydraulic motor 1.

The oil passage 6 and the pump discharge oil passage 7 are mutually connected through the oil passages 8, 9.

The intake valve 13 is disposed on the oil passage 8 to guide the pressure oil, which is discharged from the pressure oil discharge port MB of the hydraulic motor 1, from the oil passage 6 in only a direction of the pump discharge passage 7.

The safety valve 4 is disposed on the oil passage 9 to guide the pressure oil to the tank 3 through the oil passage 6 when the oil pressure in the pump discharge passage 7 becomes a prescribed level or more.

According to the embodiment described above, the control valve 20, intake valve 13, safety valve 4 and respective throttles 41, 42, 43 are built in the body 11 of the hydraulic motor 1 as indicated by the dash and dotted line in FIG. 3. Therefore, the install area of the hydraulically operated fan unit becomes small, and the hydraulically operated fan has a simple structure.

Figure 1:
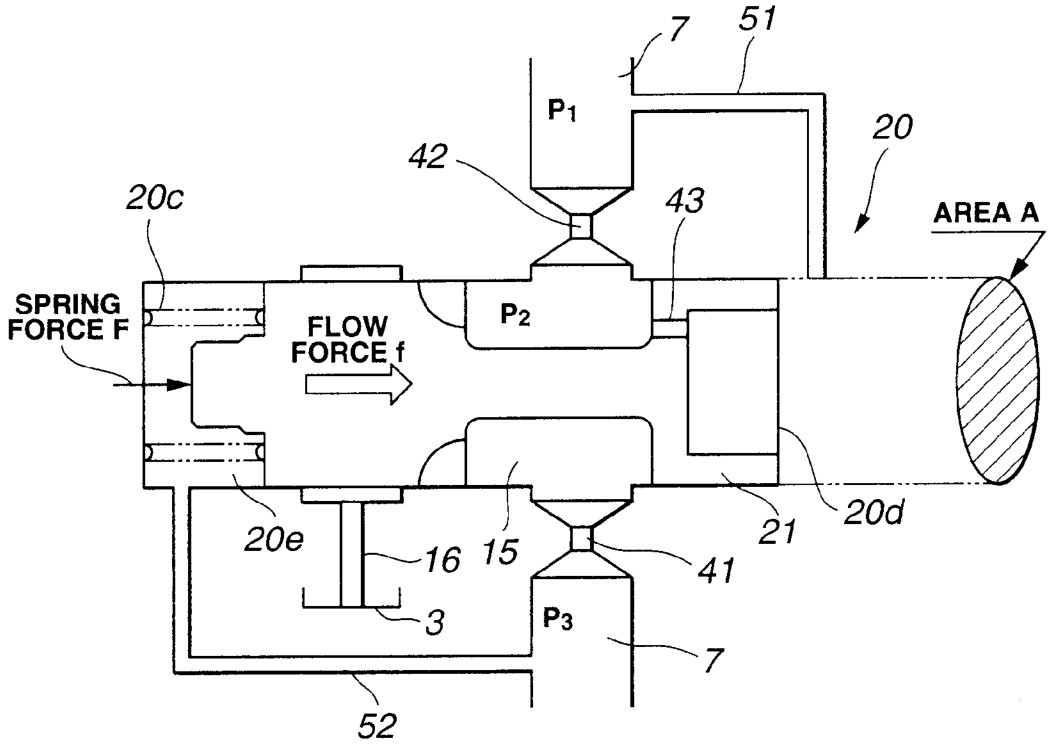
FIG. 1 is a diagram showing a structure of the control valve according to an embodiment.

The structure of the control valve 20 of FIG. 3 is shown in FIG. 1. As shown in FIG. 1, the control valve 20 is a valve having a spool structure.

Figure 2:
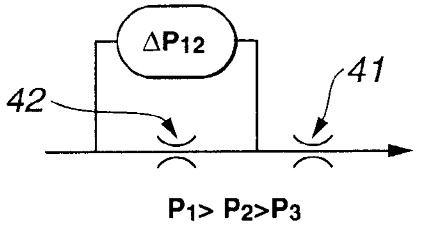
FIG. 2 is a diagram showing a pressure difference before and after of respective throttles shown in FIG. 1.

FIG. 2 shows a magnitude relation among the pressures $P_1$, $P_2$ on the upstream and downstream sides of the second throttle 42 and the pressures $P_2$, $P_3$ on the upstream and downstream sides of the first throttle 41. Relation $P_1>P_2>P_3$ holds among $P_1$, $P_2$ and $P_3$.

Referring to FIG. 1 and FIG. 2, the operation of the first embodiment will be described.

It is assumed that a pressure on the upstream side of the second throttle 42 is $P_1$, a pressure on the downstream side thereof is $P_2$ (pressure on the upstream side of the first throttle 41), a pressure on the downstream side of the first throttle 41 is $P_3$, a sectional area of the spool 21 is A, a spring force of the spring 20*c* is F and a flow force is f. Then, a balance of force acting on the spool 21 of the control valve 20 is expressed by the following expression (3).

$$(P_1-P_3)\cdot A=F+f \quad (3)$$

Here, when it is assumed that the pressure difference $P_1-P_2$ before and after the second throttle 42 is $\Delta P_{12}$ (see FIG. 2) to modify the expression (3), the following expression (4) is obtained.

$$\Delta P_{12}\cdot A+(P_2-P_3)\cdot A=f+F \quad (4)$$

The first term $\Delta P_{12}\cdot A$ of the left-hand side of the expression (4) indicates a force corresponding to the pressure difference $\Delta P_{12}$ before and after the second throttle 42, which is applied to the control valve 20 in a direction opposite to that of the spring force F of the spring 20*c* and that of the flow force f.

By adjusting the force $\Delta P_{12}\cdot A$ corresponding to the pressure difference $\Delta P_{12}$ before and after the second throttle 42 to a level capable of canceling the flow force f of the first term of the right-hand side of the expression (4), the expression (4) becomes $(P_2-P_3)\cdot A=F$ and agrees with the expression (1). Therefore, an ideal flow control characteristic indicated by $LN_3$ in FIG. 9 is obtained.

In this embodiment, by appropriately determining a diameter and the like of the second throttle 42, $\Delta P_{12}\cdot A$ corresponding to the pressure difference $\Delta P_{12}$ before and after the second throttle 42 is adjusted to a level capable of canceling the flow force f.

Therefore, the control valve 20 operates according to the expression (1) $((P_2-P_3)\cdot A=F)$, and the force $((P_2-P_3)\cdot A)$ corresponding to the pressure difference $P_2-P_3$ before and after the first throttle 41 is balanced with the prescribed spring force (F) of the spring 20*c*. Thus, the flow rate of the pressure oil flowing through the first throttle 41 is kept at a prescribed constant flow rate corresponding to the prescribed spring force, and an ideal flow control characteristic indicated by $LN_3$ in FIG. 9 can be obtained.

However, the force $\Delta P_{12}\cdot A$ according to the pressure difference $\Delta P_{12}$ before and after the second throttle 42 may become greater than the flow force f.

As indicated by $LN_4$ in FIG. 9, the flow rate flowing into the hydraulic motor may tend to decrease according to the increase in pump discharge flow rate Q depending on the adjustment of the diameter and the like of the second throttle 42.

The third throttle 43 is disposed so as to compensate the characteristic $LM_4$ to the ideal control characteristic $LN_3$. In the structure diagram of FIG. 1, the third throttle 43 is disposed in the spool 21.

Here, as described above with reference to FIG. 3, the third throttle 43 is disposed to connect the upstream side of the second throttle 42 and the downstream side of the second throttle 42. Therefore, by appropriately determining the diameter or the like of the third throttle 43, the pressure $P_1$ on the upstream side of the second throttle 42 can be decreased. But, the pressure $P_2$ shall be the lower limit. When the pressure $P_1$ on the upstream side of the second throttle 42 decreases, it can be compensated so that the force $\Delta P_{12}\cdot A$ according to the pressure difference $\Delta P_{12}$ before and after the second throttle 42 agrees with the flow force f. Thus, the ideal flow control characteristic indicated by $LN_3$ in FIG. 9 can be obtained.

Figure 4:
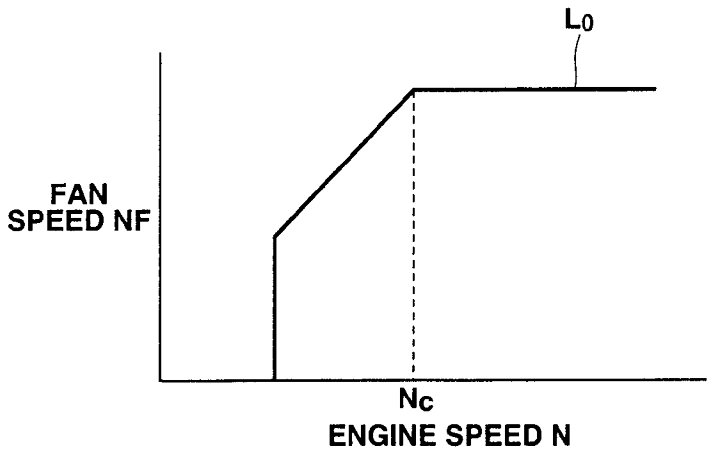
FIG. 4 is a diagram showing a relation between an engine speed and a rotational speed of a fan in correspondence with FIG. 3.

FIG. 4 shows a relation between the engine speed N and the rotational speed NF of the fan 36 of the first embodiment.

When controlled according to the control characteristic $LN_3$ shown in FIG. 9, the engine speed increases, the discharge flow rate Q of the hydraulic pump 2 becomes the prescribed flow rate Qc or more, and the flow rate flowing into the hydraulic motor 1 is kept at the prescribed level. Therefore, when the engine speed N becomes the prescribed speed Nc or more as shown in FIG. 4, characteristic $L_0$ of keeping the rotational speed NF of the fan 36 at a prescribed level can be obtained. Therefore, the effect of suppressing a noise to a prescribed level when the engine speed is at the prescribed level Nc or more can be achieved by inexpensive hydraulic equipment such as the fixed-capacity hydraulic pump 2, changeover valve 20, and throttles 42, 43.

And, as shown in FIG. 1, the third throttle 43 is formed in the spool 21. Therefore, the third throttle 43 can be easily added to the existing control valve 20, and the production cost can be reduced. In this embodiment, the third throttle 43 is disposed but it may be omitted.

According to the first embodiment as described above, the ideal flow control characteristic can be achieved by inexpensive hydraulic equipment, and a low-cost and low-noise hydraulic drive unit can be put on the market.

The hydraulic circuit shown in FIG. 3 can be modified in various ways as follows. Descriptions common to those already made in the first embodiment will be omitted, and different matters only will be described below.

Figure 5:
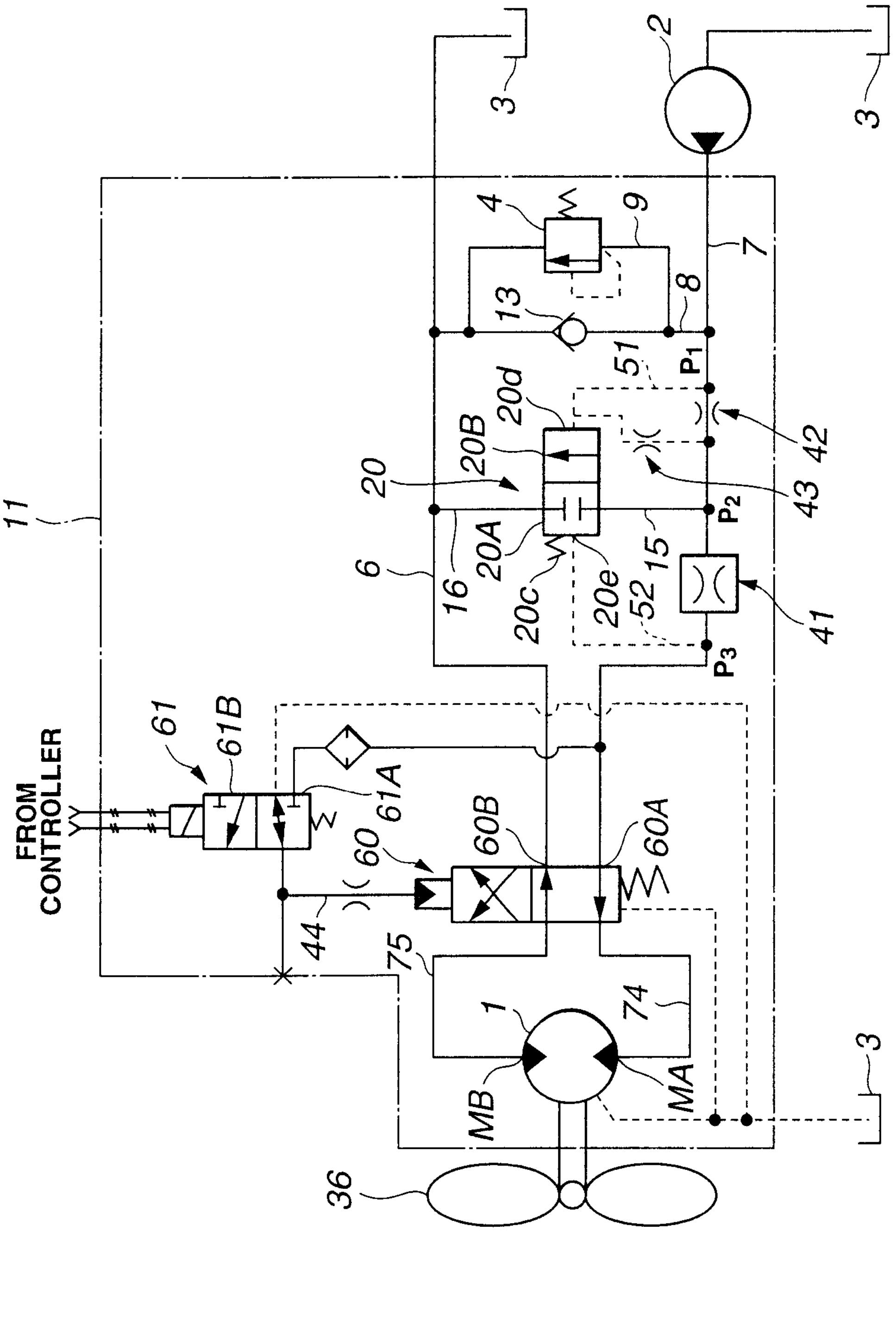
FIG. 5 shows a hydraulic circuit diagram according to a second embodiment.

FIG. 5 shows a second embodiment in which a changeover valve 60 and an electromagnetic proportional control valve 61 for operating the changeover valve 60 are added to the hydraulic circuit of FIG. 3.

In FIG. 5, the pump discharge oil passage 7 is connected to the pump port P of the changeover valve 60. A tank port T of the changeover valve 60 is connected to the tank 3 through the oil passage 6. The hydraulic motor 1 has two pressure oil supply and discharge ports MA, MB.

The changeover valve 60 and the pressure oil supply and discharge ports MA, MB of the hydraulic motor 1 are connected through oil passages 74, 75.

The changeover valve 60 inputs the pump discharge pressure oil through the oil passage 7 and controls the direction of the pressure oil to supply it to the port MA or MB of the hydraulic motor 1.

The changeover valve 60 is a 2-position changeover valve having forward rotation position 60A and reverse rotation position 60B. The changeover valve 60 is built in the body 11 of the hydraulic motor 1.

The electromagnetic proportional control valve 61 is a 2-position changeover valve having low pressure position 61A and high pressure position 61B. The electromagnetic proportional control valve 61 switches its valve position according to an electric instruction signal output from an unshown controller. When the electromagnetic proportional control valve 61 is switched to the high pressure position 61B, a high pump discharge pressure within the pump discharge oil passage 7 is guided as a pilot pressure to the pilot port of the changeover valve 60 through the oil passage 44. When the electromagnetic proportional control valve 61 is switched to the low pressure position 61A, the pilot port of the changeover valve 60 is communicated with the tank 3, and the low pilot pressure acts on the pilot port of the changeover valve 60. The electromagnetic proportional control valve 61 is built in the body 11 of the hydraulic motor 1.

The changeover valve 60 is switched to the forward rotation position 60A when the low pilot pressure acts on the pilot port and switched to the reverse rotation position 60B when the high pilot pressure acts on the pilot port.

When the changeover valve 60 is switched to the forward rotation position 60A, the pressure oil is supplied to the port MA of the hydraulic motor 1, and the hydraulic motor 1 revolves in the forward direction. When the changeover valve 60 is switched to the reverse rotation position 60B, the pressure oil is supplied to the port MB of the hydraulic motor 1, and the hydraulic motor 1 revolves in the reverse direction.

Therefore, the hydraulic circuit of FIG. 5 works as follows.

To switch the cooling fan 36 to the forward rotation direction, the electric instruction signal which switches the electromagnetic proportional control valve 61 to the low pressure position 61A and switches the changeover valve 60 to the forward rotation direction 60A is output from the controller to the electromagnetic proportional control valve 61.

When the changeover valve 60 is switched to the forward rotation position 60A, the pressure oil discharged from the hydraulic pump 2 flows through the pump discharge oil passage 7 and the changeover valve 60 and is supplied to the port MA of the hydraulic motor 1 through the oil passage 74. Thus, the hydraulic motor 1 revolves forward, and the cooling fan 36 revolves in the forward direction.

When the cooling fan 36 is switched to the reverse rotation direction, an electric instruction signal which switches the electromagnetic proportional control valve 61 to the high pressure position 61B and the changeover valve 60 to the reverse rotation position 60B is output from the controller to the electromagnetic proportional control valve 61.

When the changeover valve 60 is switched to the reverse rotation position 60B, the pressure oil discharged from the hydraulic pump 2 passes through the pump discharge oil passage 7 and the changeover valve 60 and is supplied to the port MB of the hydraulic motor 1 through the oil passage 75. Thus, the hydraulic motor 1 revolves reverse, and the cooling fan 36 revolves in a reverse direction.

Other component elements of the hydraulic circuit shown in FIG. 5 are substantially the same as those of the hydraulic circuit shown in FIG. 3. The second embodiment can also achieve an ideal flow control characteristic by the inexpensive hydraulic equipment in the same way as in the first embodiment.

Figure 6:
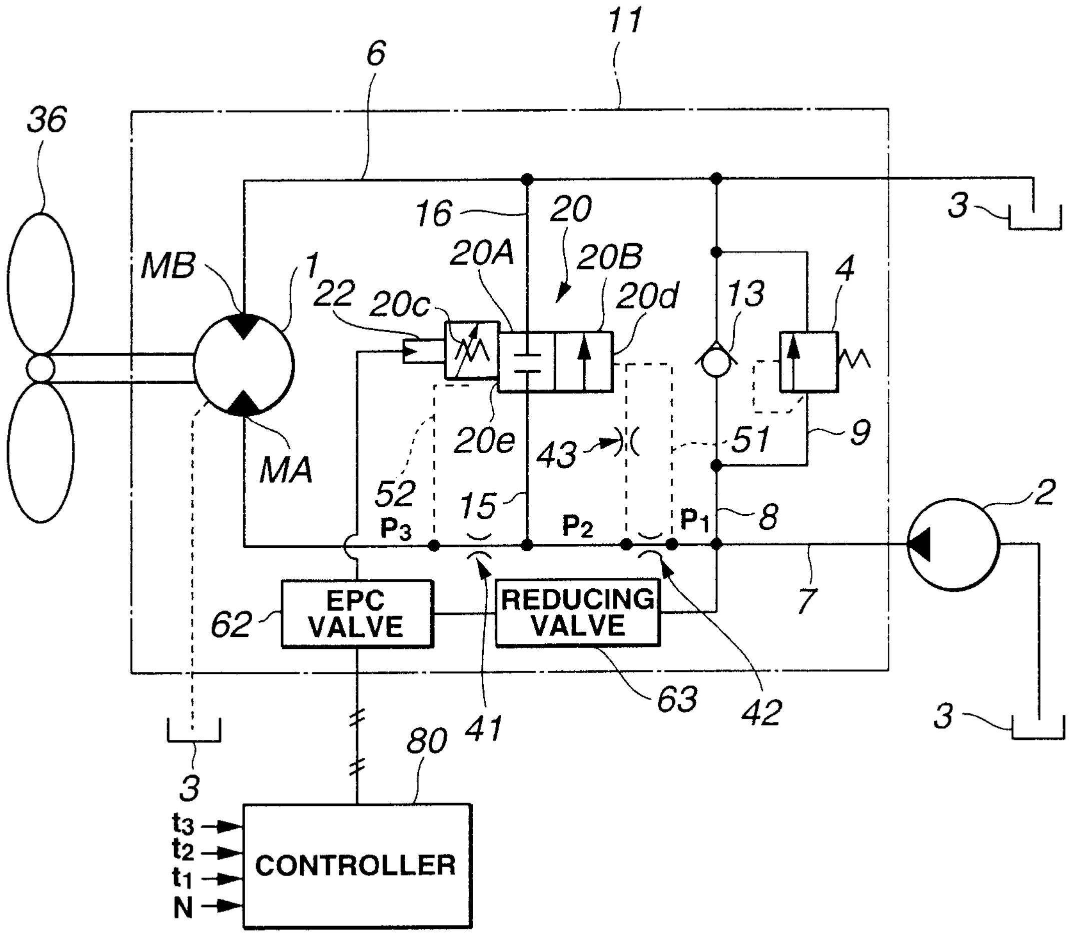
FIG. 6 shows a hydraulic circuit diagram according to a third embodiment.

FIG. 6 shows a third embodiment in which a device capable of varying the prescribed spring force of the spring 20*c* of the control valve 20 is added to the hydraulic circuit of FIG. 3.

As shown in FIG. 6, the control valve 20 is provided with the pilot port 22 which varies the prescribed spring force of the spring 20*c* according to the acting pilot pressure. EPC valve 62 (electromagnetic proportional control valve 62) applies the pilot pressure to the pilot port 22 of the control valve 20. A reducing valve 63 reduces the pressure of the pressure oil within the pump discharge oil passage 7 and supplies the original pressure to the EPC valve 62. The EPC valve 62 and the reducing valve 63 are built in the body 11 of the hydraulic motor 1.

Controller 80 outputs an electric instruction signal to the EPC valve 62. The EPC valve 62 outputs a pilot pressure according to the electric instruction signal with the pressure oil supplied from the reducing valve 63 being as the original pressure. Detected values t ($t_1$, $t_2$, $t_3$) of the cooling water temperature of the radiator and the detected value N of the engine speed are input to the controller 80. The controller 80 produces and outputs an electromagnetic instruction signal according to the input detected values to control the rotational speed NF of the cooling fan 36.

Figure 7A:
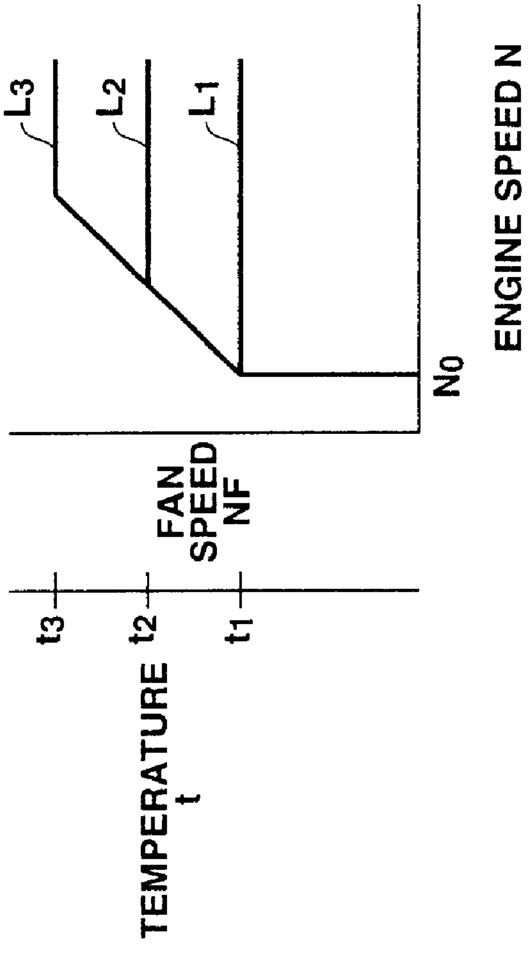
FIGS. 7A and 7B are diagrams each showing a relation between the engine speed and the rotational speed of the fan in correspondence with FIG. 6.

FIG. 7A shows control characteristic of this embodiment. It is assumed in the following description of operation that the cooling water temperature t in the radiator has a threshold value on a scale of $t_1$, $t_2$ and $t_3$ and they are related as $t_1<t_2<t_3$. It is assumed that the prescribed spring force Fc of the spring 20*c* of the control valve 20 is determined to have a scale of $Fc_1$, $Fc_2$ and $Fc_3$, and they are related as $Fc_1<Fc_2<Fc_3$.

Specifically, when the cooling water temperature t of the radiator is at a low temperature $t_1$ or below, the controller 80 produces and outputs an electric instruction signal for setting the prescribed spring force Fc of the spring 20*c* of the control valve 20 to the low value $Fc_1$ so that the control characteristic $L_1$ of FIG. 7A can be obtained.

Thus, the prescribed spring force Fc of the spring 20*c* of the control valve 20 is set to the low value $Fc_1$ so as to obtain the control characteristic as indicated by $L_1$ in FIG. 7A. Specifically, when the cooling water of the radiator has a low temperature, the rotational speed NF of the cooling fan 36 is kept at a low and constant rotational speed.

Similarly, when the cooling water temperature t of the radiator is at a high temperature $t_3$ or more, the controller 80 produces and outputs an electric instruction signal for setting the prescribed spring force Fc of the spring 20*c* of the control valve 20 to the high value $Fc_3$ so that the control characteristic $L_3$ of FIG. 7A can be obtained.

Thus, the prescribed spring force Fc of the spring 20*c* of the control valve 20 is set to the high value $Fc_3$, and the control characteristic indicated by $L_3$ in FIG. 7A can be obtained. In other words, when the cooling water of the radiator has a high temperature, the rotational speed NF of the cooling fan 36 is kept at a high constant rotational speed.

Similarly, when the cooling water temperature t of the radiator is at an intermediate temperature $t_2$ or more (less than t3), the controller 80 produces and outputs an electric instruction signal for setting the prescribed spring force Fc of the spring 20*c* of the control valve 20 to the intermediate value $Fc_2$ so that the control characteristic $L_2$ of FIG. 7A can be obtained.

Thus, the prescribed spring force Fc of the spring 20*c* of the control valve 20 is set to the intermediate value $Fc_2$, and the control characteristic indicated by $L_2$ in FIG. 7A can be obtained. In other words, when the cooling water of the radiator has the intermediate temperature, the rotational speed NF of the cooling fan 36 is kept at the intermediate constant rotational speed.

When the engine speed N is a prescribed rotational speed $N_0$ or below, the controller 80 produces and outputs an electric instruction signal for setting the prescribed spring force Fc of the spring 20*c* of the control valve 20 to a minimum value.

Thus, the prescribed spring force Fc of the spring 20*c* of the control valve 20 is set to the minimum value, the pressure oil in the pump discharge oil passage 7 is discharged to the tank 3 through the control valve 20, and the flow rate flowing into the hydraulic motor 1 becomes minimum. As a result, as shown in FIG. 7A, there is obtained the control characteristic that the cooling fan 36 stops revolving when the engine speed N becomes the prescribed speed $N_0$ or below.

Figure 7B:
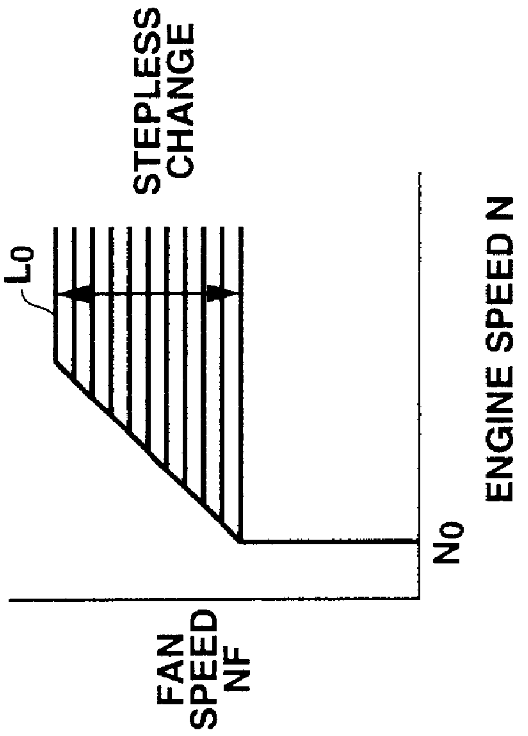

FIG. 7A shows an example that the control characteristic changes in multiple stages, but the control characteristic $L_0$ may continuously change stepless as shown in FIG. 7B Other component elements of the hydraulic circuit shown in FIG. 6 are substantially the same as those of the hydraulic circuit of FIG. 3, and the third embodiment can also achieve the ideal flow control characteristic by the inexpensive hydraulic equipment in the same way as in the first embodiment.

Figure 8:
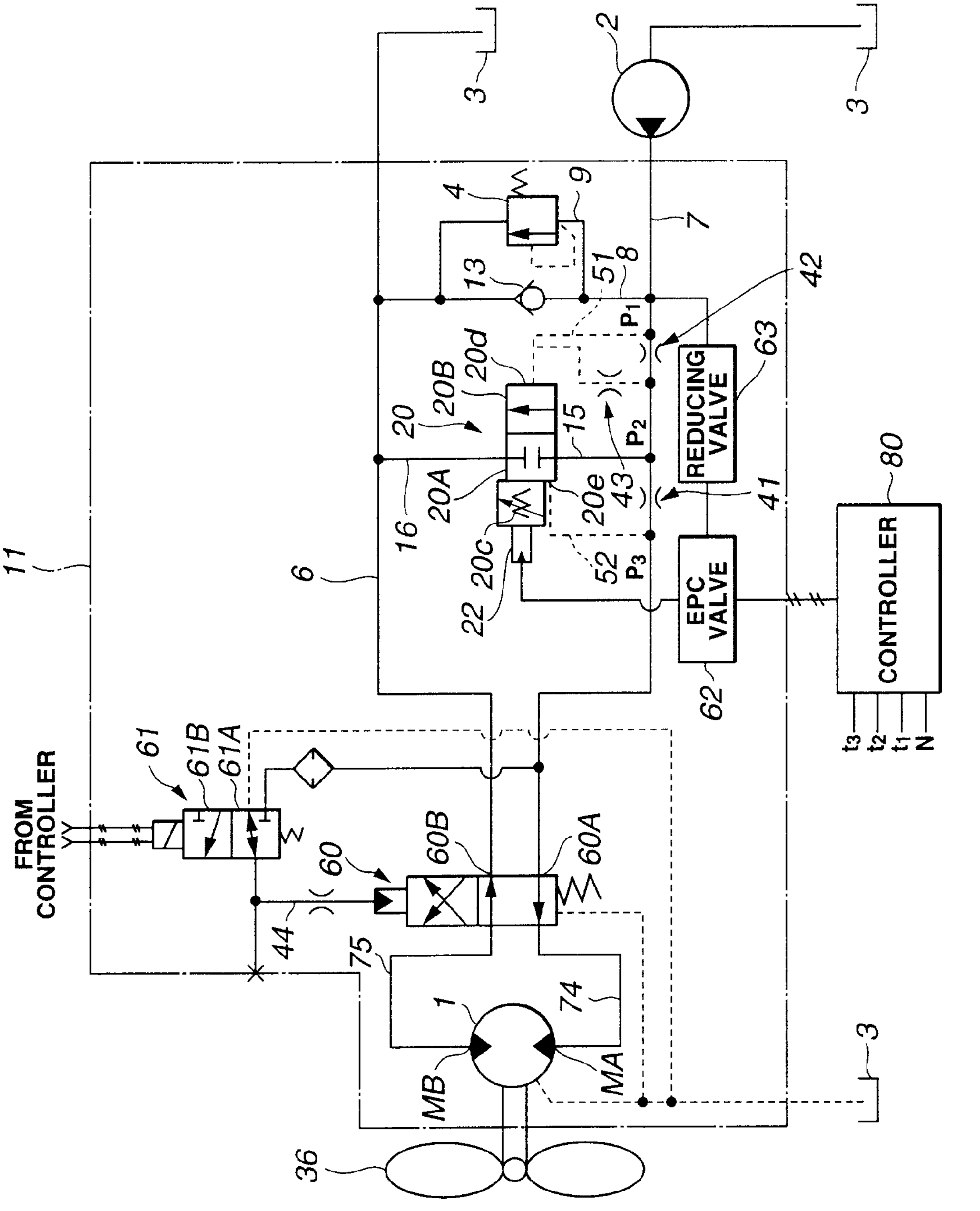
FIG. 8 shows a hydraulic circuit diagram according to a fourth embodiment.

FIG. 8 shows the hydraulic circuit of a fourth embodiment which is a combination of the hydraulic circuit of the second embodiment shown in FIG. 5 and the hydraulic circuit of the third embodiment shown in FIG. 6. Specifically, the hydraulic circuit of FIG. 5 has the hydraulic circuit of FIG. 3 provided with the changeover valve 60 and the electromagnetic proportional control valve 61 for operating the changeover valve 60 and also with the devices (the controller 80, the EPC valve 62, the reducing valve 63, and the pilot port 22) which can change the prescribed spring force of the spring 20*c* of the control valve 20. Therefore, according to the fourth embodiment, the operation is made in the same way as in the second and third embodiments, and the same effect as in the first embodiment can be obtained.

In the second, third and fourth embodiments, the third throttle 43 can be omitted in the same way as in the first embodiment.

In the embodiments described above, the throttle 42 for adjusting the flow force is disposed, and the force $\Delta P_{12}\cdot A$ according to the pressure difference $\Delta P_{12}$ before and after the throttle 42 is applied to the control valve 20 so as to cancel the flow force f produced by the control valve 20.

However, the present invention does not necessarily require the throttle 42 and can use other means which can apply a force capable of canceling the flow force f produced by the control valve 20 to the control valve 20.

Then, an example structure of the hydraulic motor 1 of the first embodiment will be described with reference to FIG. 16 and FIG. 12.

Figure 16:
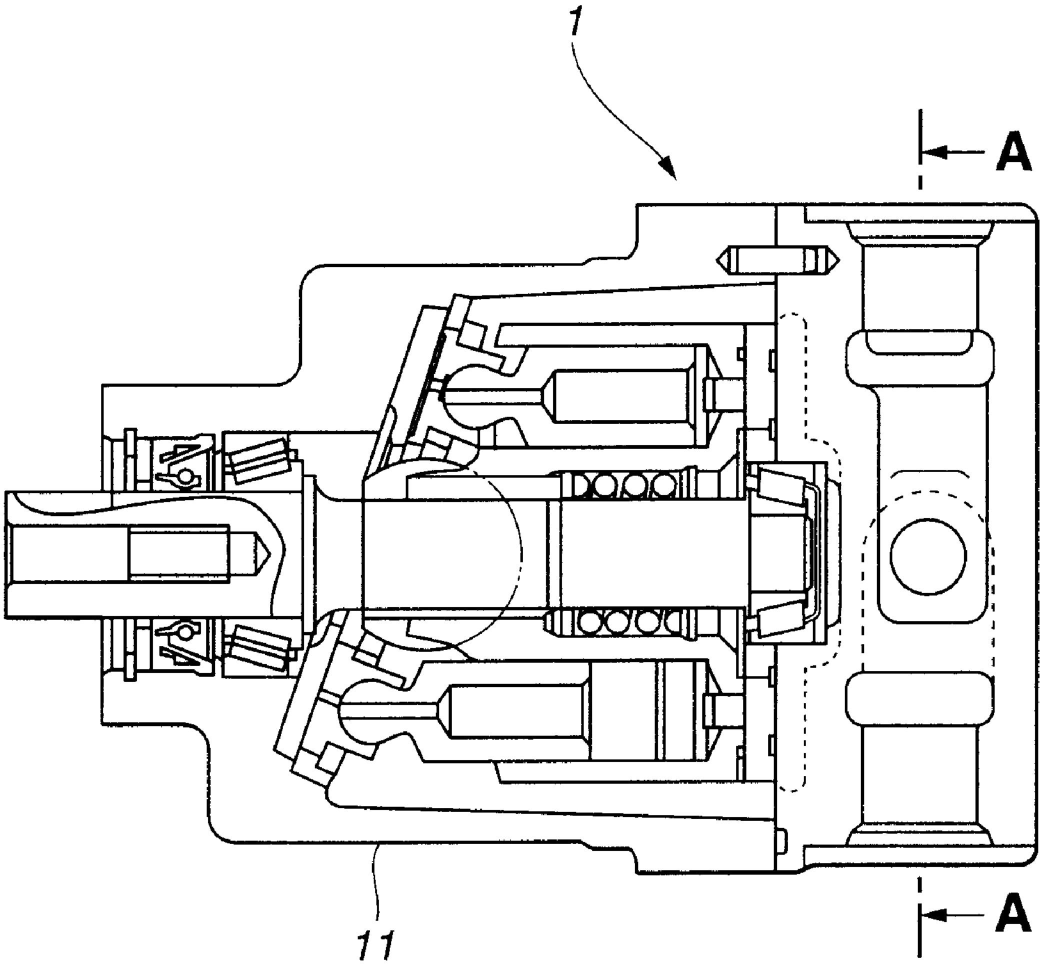
FIG. 16 is a sectional diagram of the hydraulic motor.

FIG. 16 is a sectional diagram of the body 11 of the hydraulic motor 1.

Figure 12:
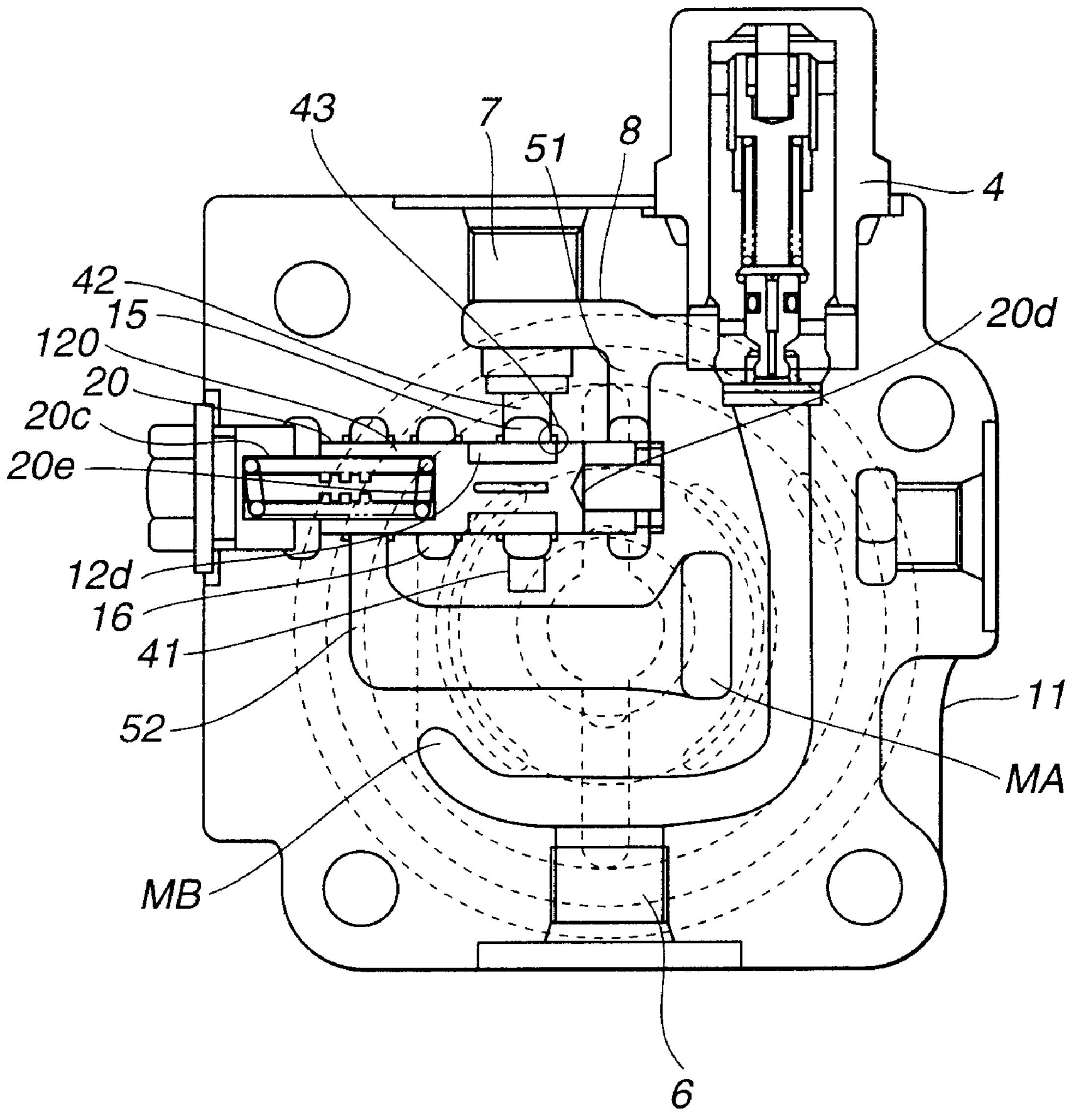
FIG. 12 is a sectional diagram of the hydraulic motor according to the first embodiment.

FIG. 12 is a sectional diagram taken along line A—A of the body 11 shown in FIG. 16.

As shown in FIG. 12, a spool 120 of the control valve 20 is slidably housed in the body 11 as shown in FIG. 12.

An operation shown in FIG. 12 will be described.

The pressure oil discharged from the hydraulic pump 2 passes through the second throttle 42, a notch 120*a* of the spool 120 and the first throttle 41 via the pump discharge oil passage 7 in the body 11. Pilot pressure P1 on the upstream side of the second throttle acts on the pilot port 20*d* of the spool 120 on the right side in the drawing via the pilot oil passage 51, and the pilot pressure on the downstream side of the third throttle 43, which has passed through the second throttle 42 and the third throttle 43 also acts on the pilot port 20*d* of the spool 120 through the passage in the spool 120. And, pilot pressure P3 on the downstream side of the first throttle 41 acts via the pilot oil passage 52 on the pilot port 20*e*, which is provided on the spring 20*c* side of the spool 120 on the left side in the drawing.

When a flow rate passing through the second throttle 42 and the first throttle 41 is small and the pressure difference P1−P3 is smaller than a prescribed pressure which is determined by the spring 20*c*, the spool 120 of the control valve 20 is positioned on the right side (on the side of the shut-off position 20A in FIG. 3) as shown in the drawing. At this time, the pressure oil passing through the pump discharge oil passage 7 is not discharged to the tank 3 but supplied to the pressure oil supply port MA via the notch 120*a* of the spool 120.

Meanwhile, when the flow rate passing through the second throttle 42 and the first throttle 41 is high and the pressure difference P1−P3 has the prescribed level or higher which is determined by the spring 20*c*, the spool 120 is positioned on the left side in the drawing (on the side of the open position 20B in FIG. 3) and opened to communicate the oil passage 15 and the oil passage 16. At this time, the pressure oil passing through the pump discharge oil passage 7 is partly discharged to the tank 3 outside the body 11 via the oil passage 15, the notch 120*a* of the spool 120, the opening of the spool 120, the oil passage 16 and the oil passage 6.

The body 11 is provided with the safety valve 4 which is integrally formed with the intake valve 13.

The intake valve 13 is opened by the pressure oil discharged from the pressure oil discharge port MB, and the pressure oil discharged form the port MB is guided to the pump discharge oil passage 7 via the intake valve 13 and the oil passage 8.

When the oil pressure in the pump discharge oil passage 7 becomes a prescribed level or higher, the safety valve 4 opens, and the pressure oil in the oil passage 7 is guided to the tank 3 outside the body 11 via the oil passage 8, the safety valve 4 and the oil passage 6.

Then, an example structure of the hydraulic motor 1 of the second embodiment will be described with reference to FIG. 13A.

FIG. 13 A is a sectional diagram taken along line A—A of the body 11 shown in FIG. 16.

Figure 13A:
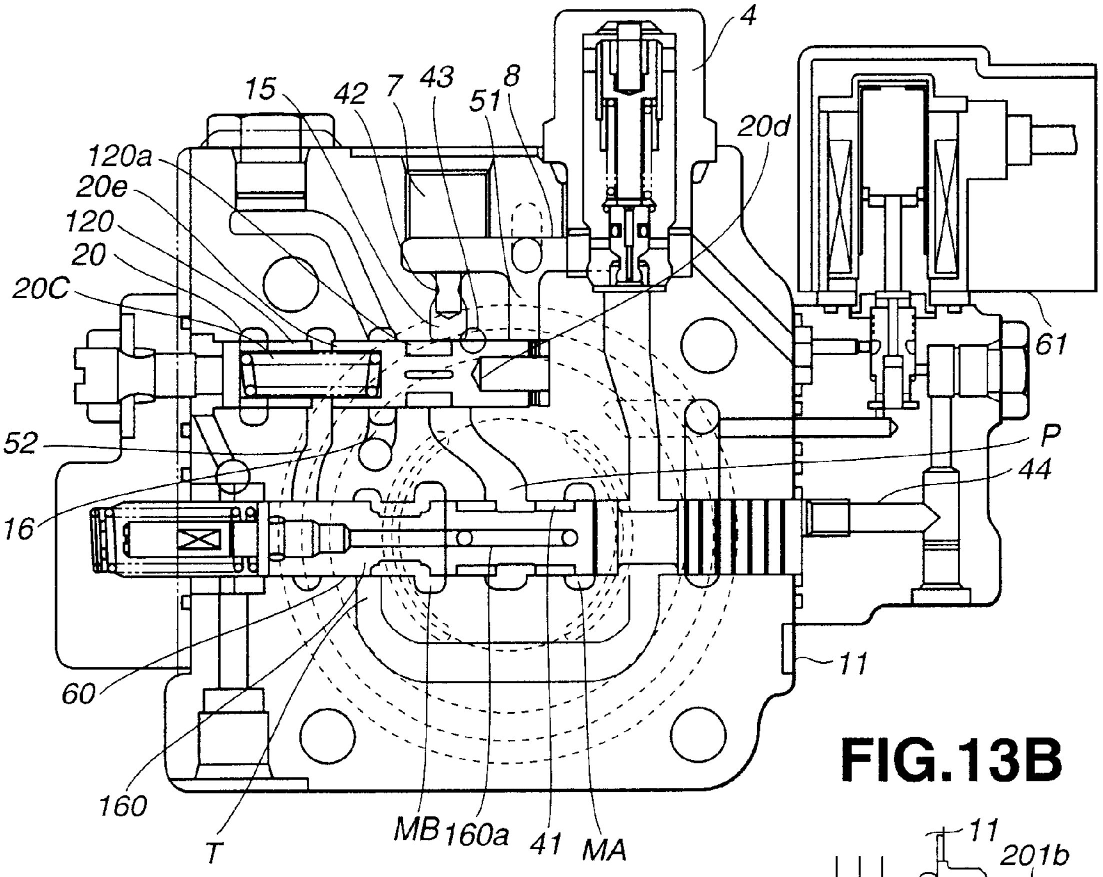
FIG. 13A is a sectional diagram showing the hydraulic motor according to the second embodiment.

As shown in FIG. 13A, the spool 120 of the control valve 20 is slidably housed in the body 11. And, a spool 160 of the changeover valve 60 is slidably housed in the body 11.

An operation shown in FIG. 13A will be described.

The pressure oil discharged from the hydraulic pump 2 passes through the second throttle 42, the notch 120*a* of the spool 120 and the first throttle 41 via the pump discharge oil passage 7 in the body 11. The pilot pressure P1 on the upstream side of the second throttle acts on the pilot port 20*d* of the spool 120 on the right side in the drawing via the pilot oil passage 51, and the pilot pressure on the downstream side of the third throttle 43, which has passed through the second throttle 42 and the third throttle 43 acts via the passage in the spool 120. The pilot pressure P3 on the downstream side of the first throttle 41 acts on the pilot port 20*e*, which is disposed on the side of the spring 20*c* of the spool 120 on the left side in the drawing, via the passage 160*a* in the spool 160 and the pilot oil passage 52.

When the flow rate passing through the second throttle 42 and the first throttle 41 is small and the pressure difference P1−P3 is smaller than a prescribed level determined by the spring 20*c*, the spool 120 of the control valve 20 is positioned on the right side (on the side of the shut-off position 20A in FIG. 5) as shown in the drawing. At this time, the pressure oil passing through the pump discharge oil passage 7 is not discharged to the tank 3 but guided to the pump port P via the notch 120*a* of the spool 120.

Meanwhile, when the flow rate passing through the second throttle 42 and the first throttle 41 is high and the pressure difference P1−P3 has the prescribed level or higher which is determined by the spring 20*c*, the spool 120 is positioned on the left side in the drawing (on the side of the open position 20B in FIG. 5) and opens to communicate the oil passage 15 and the oil passage 16. At this time, the pressure oil passing through the pump discharge oil passage 7 is partly guided to the tank port T via the oil passage 15, the notch 120*a* of the spool 120, the opening of the spool 120, the oil passage 16 and the oil passage 6.

When a low pilot pressure is acting on the pilot port of the spool 160 of the changeover valve 60 on the right side in the drawing from the electromagnetic proportional control valve 61 via the oil passage 44, the spool 160 is positioned on the right side in the drawing as shown in the drawing. In this position, the pump port P communicates with the port MA, and the port MB communicates with the tank port T. Therefore, the pressure oil guided to the pump port P is supplied to the port MA via the opening of the spool 160, and the hydraulic motor 1 runs forward.

When a high pilot pressure is acting on the pilot port of the spool 160 of the changeover valve 60 on the right side in the drawing from the electromagnetic proportional control valve 61 via the oil passage 44, the spool 160 moves from the shown position to the left side in the drawing. When the spool 160 is positioned on the left side in the drawing, the pump port P communicates with the port MB, and the port MA communicates with the tank port T. Therefore, the pressure oil guided to the pump port P is supplied to the port MB via the opening of the spool 160, and the hydraulic motor 1 runs reverse.

The body 11 is provided with the safety valve 4, which is integrally formed with the intake valve 13 in the same way as in FIG. 12 and operates in the same way.

Figure 13B:
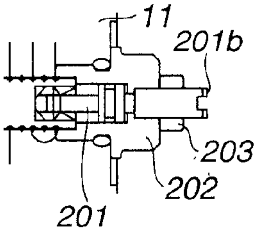
FIG. 13B is a diagram showing an example configuration for manually switching the spool of the changeover valve.

In FIG. 13 A, the spool 160 is automatically switched by the electromagnetic proportional control valve 61, but as shown in FIG. 13B, the spool 160 can be configured so to be switched manually.

As shown in FIG. 13B, an engagement member 201 is engaged with a right end part of the spool 160 in the drawing. The engagement member 201 is screwed into a bolt 202, and the exterior of the bolt 202 is screwed into the body 11.

When a knob 201*b* of the engagement member 201 at the right end in the drawing is turned with a slotted screwdriver or the like, the engagement member 201 is moved horizontally in the drawing with respect to the bolt 202, and the spool 160 is switched. After the changeover position of the spool 160 is adjusted, the engagement member 201 and the bolt 202 are fixed with a lock nut 203.

Then, an example structure of the hydraulic motor 1 of the third embodiment will be described with reference to FIG. 14.

Figure 14:
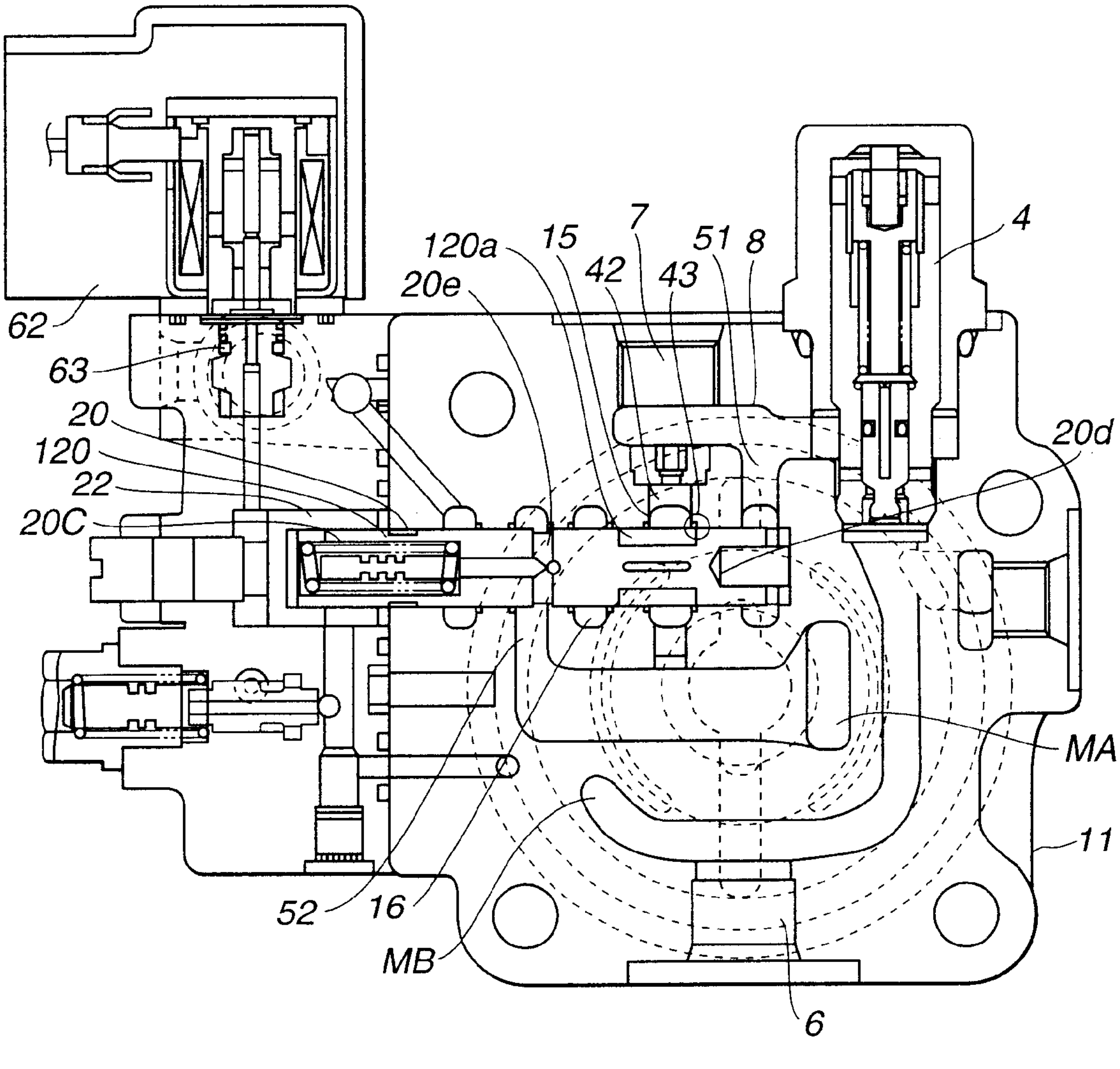
FIG. 14 is a sectional diagram showing the hydraulic motor according to the third embodiment.

FIG. 14 is a sectional diagram taken along line A—A of the body 11 shown in FIG. 16.

As shown in FIG. 14, the spool 120 of the control valve 20 is slidably housed in the body 11.

An operation of FIG. 14 will be described.

The pressure oil in the pump discharge oil passage 7 is decompressed by the reducing valve 63 and supplied as the original pressure to the EPC valve 62. The EPC valve 62 applies a pilot pressure to the pilot port 22 of the spool 120 of the control valve 20 on the left side in the drawing. A prescribed spring force of the spring 20*c* is variable depending on the magnitude of the pilot pressure applied to the pilot port 22 of the spool 120. The spool 120 of the control valve 20 operates in the same way as that shown in FIG. 12. The intake valve 13 and the safety valve 4 also operate in the same way.

Then, an example structure of the hydraulic motor 1 of the fourth embodiment will be described with reference to FIG. 15A.

Figure 15A:
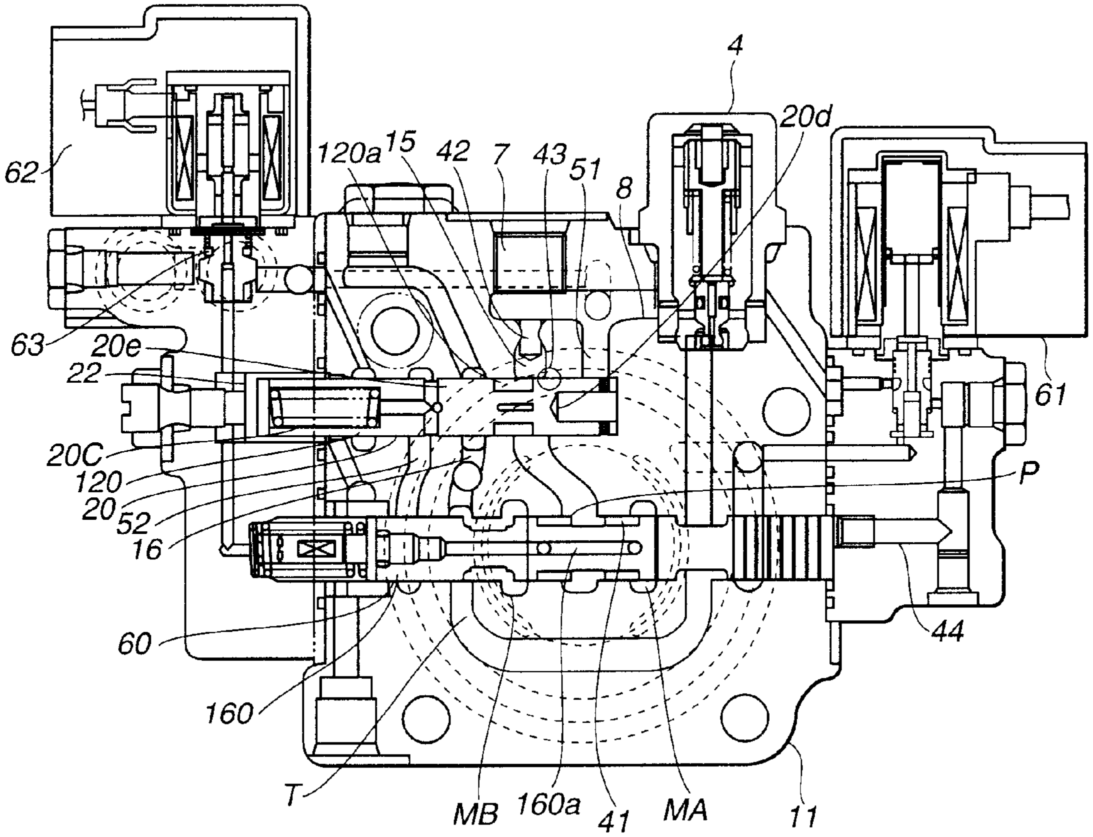
FIG. 15A is a sectional diagram showing the hydraulic motor according to the fourth embodiment.

FIG. 15A is a sectional diagram taken along line A—A of the body 11 shown in FIG. 16.

As shown in FIG. 15A, the spool 120 of the control valve 20 is slidably housed in the body 11. And, the spool 160 of the changeover valve 60 is slidably housed in the body 11.

An operation shown in FIG. 15A will be described.

The pressure oil in the pump discharge oil passage 7 is decompressed by the reducing valve 63 and supplied as the original pressure to the EPC valve 62. The EPC valve 62 applies a pilot pressure to the pilot port 22 of the spool 120 of the control valve 20 on the left side in the drawing. The prescribed spring force of the spring 20*c* is variable depending on the magnitude of the pilot pressure applied to the pilot port 22 of the spool 120. Subsequently, the spool 120 of the control valve 20 operates in the same way as in FIG. 13A. The spool 160 of the changeover valve 60 operates in the same way as in FIG. 13A. The intake valve 13 and the safety valve 4 also operate in the same way.

Figure 15B:
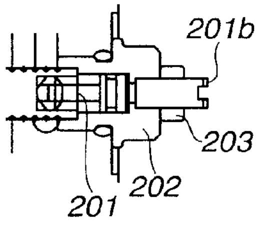
FIG. 15B is a diagram showing an example configuration for manually switching the spool of the changeover valve.

In FIG. 15A, the spool 160 is automatically switched by the electromagnetic proportional control valve 61, but it may be configured in the same way as that shown in FIG. 15B to switch the spool 160 manually.

In the embodiments described above, the description was made assuming that the hydraulic motor is driven to control the rotation of the fan. But, the hydraulic equipment to be driven according to the present invention is not limited to the hydraulic motor, and the subject to be controlled is not limited to the rotational speed of the fan. The present invention can be applied to driving of any type of hydraulic equipment.

What is claimed is:

1. A hydraulic drive unit comprising:

a hydraulic source which increases a discharge flow rate according to an increase in rotational speed;

a throttle through which pressure oil discharged from the hydraulic source passes;

hydraulic equipment which operates upon inputting the pressure oil having passed through the throttle; and a control valve which controls the pressure oil passing through the throttle so that the flow rate passing through the throttle becomes a prescribed level when the rotational speed becomes a prescribed level or more, wherein:

means for producing a force for canceling a flow force produced by the control valve is applied to the control valve.

2. The hydraulic drive unit according to claim 1, wherein a throttle for adjusting the flow force, which produces a pressure difference corresponding to the flow force, is disposed, and the force corresponding to the pressure difference before and after the flow force adjustment throttle is applied to the control valve.

3. The hydraulic drive unit according to claim 1, wherein the hydraulic equipment is a hydraulic motor for driving a fan.

4. The hydraulic drive unit according to claim 1, wherein the hydraulic equipment is a hydraulic motor, and the control valve and the throttle are built in the hydraulic motor.

5. The hydraulic drive unit according to claim 1, wherein the hydraulic source is a fixed-capacity hydraulic pump.

6. The hydraulic drive unit according to claim 1, wherein prescribed flow rate adjustable means which varies the prescribed flow rate is further disposed.

7. A hydraulic drive unit comprising:

a hydraulic source which increases a discharge flow rate according to an increase in rotational speed;

a first throttle through which pressure oil discharged from the hydraulic source passes;

hydraulic equipment which operates upon inputting the pressure oil having passed through the first throttle; and a control valve which controls the pressure oil passing through the first throttle so that the flow rate passing through the first throttle becomes a prescribed level when the rotational speed becomes a prescribed level or more, wherein:

a second throttle which produces a pressure difference corresponding to a force for canceling the flow force produced by the control valve is disposed; and the force corresponding to the pressure difference before and after the second throttle is applied to the control valve in a direction to cancel the flow force.

8. The hydraulic drive unit according to claim 7, wherein:

the control valve is provided with a spring for producing a spring force corresponding to the prescribed flow rate;

the second throttle is disposed on the upstream side of the first throttle;

the pressure on the upstream side of the second throttle is applied to the control valve on the side opposite to the spring; and a pressure on the downstream side of the first throttle is applied to the control valve on the same side as the spring.

9. The hydraulic drive unit according to claim 8, wherein a third throttle is further disposed to adjust the pressure on the upstream side of the second throttle.

10. The hydraulic drive unit according to claim 9, wherein the third throttle is formed in a spool of the control valve.

11. The hydraulic drive unit according to claim 7, wherein the hydraulic equipment is a hydraulic motor for driving a fan.

12. The hydraulic drive unit according to claim 7, wherein the hydraulic equipment is a hydraulic motor, and the control valve and the throttle are built in the hydraulic motor.

13. The hydraulic drive unit according to claim 7, wherein the hydraulic source is a fixed-capacity hydraulic pump.

14. The hydraulic drive unit according to claim 7, wherein prescribed flow rate adjustable means which varies the prescribed flow rate is further disposed.

* * * * *